United States Patent
Thakur et al.

(10) Patent No.: US 11,989,279 B2
(45) Date of Patent: May 21, 2024

(54) METHOD AND SYSTEM FOR SERVICE IMAGE DEPLOYMENT IN A CLOUD COMPUTING SYSTEM BASED ON DISTRIBUTED LEDGER TECHNOLOGY

(71) Applicant: Telefonaktiebolaget LM Ericsson (publ), Stockholm (SE)

(72) Inventors: Mukesh Thakur, Espoo (FI); James Kempf, Mountain View, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 373 days.

(21) Appl. No.: 17/596,898

(22) PCT Filed: Jun. 20, 2019

(86) PCT No.: PCT/SE2019/050598
§ 371 (c)(1),
(2) Date: Dec. 20, 2021

(87) PCT Pub. No.: WO2020/256608
PCT Pub. Date: Dec. 24, 2020

(65) Prior Publication Data
US 2022/0309143 A1    Sep. 29, 2022

(51) Int. Cl.
*G06F 21/44*    (2013.01)
*G06F 8/61*    (2018.01)
(Continued)

(52) U.S. Cl.
CPC ............ *G06F 21/44* (2013.01); *G06F 8/63* (2013.01); *G06F 21/602* (2013.01); *G06F 21/606* (2013.01); *G06F 21/64* (2013.01)

(58) Field of Classification Search
CPC .......... G06F 21/44; G06F 8/63; G06F 21/602; G06F 21/606; G06F 21/64
See application file for complete search history.

(56) References Cited

U.S. PATENT DOCUMENTS 10,447,483 B1 * 10/2019 Su .................. H04L 9/3226
2006/0236083 A1 * 10/2006 Fritsch ............. H04L 67/34
713/1

(Continued)

FOREIGN PATENT DOCUMENTS

| CN | 107704257 A | 2/2018 |
| CN | 109189464 A | 1/2019 |
| WO | 2019242288 A1 | 12/2019 |

OTHER PUBLICATIONS

International Search Report and Written Opinion for Application No. PCT/SE2019/050598, Mar. 16, 2020, 11 pages.

(Continued)

*Primary Examiner* — Ayoub Alata
(74) *Attorney, Agent, or Firm* — Nicholson De Vos Webster & Elliott LLP

(57) ABSTRACT

A method and system for service image deployment in a cloud computing system based on distributed ledger technology are described. A first signed message including a request to authorize installation of a service image, a service image identifier, a service installer account identifier, and one or more hashes of the service image is received. Responsive to determining, based on the service installer account identifier and a distributed ledger, that the service installer is authorized to install a service image identified with the service image identifier in a cloud computing system: the one or more hashes of the service image are recorded in a list of valid service images of the distributed ledger; and a first message is transmitted to the service installer. The message includes a first service installation token and the service image identifier, that cause the service installer to install the service image in the cloud computing system.

18 Claims, 12 Drawing Sheets

(51) Int. Cl.
*G06F 21/60* (2013.01)
*G06F 21/64* (2013.01)

(56) References Cited

U.S. PATENT DOCUMENTS

| | | | |
|---|---|---|---|
| 2018/0089436 A1 | 3/2018 | Smith et al. | |
| 2018/0183587 A1* | 6/2018 | Won | H04L 63/166 |
| 2018/0285568 A1 | 10/2018 | Finger | |
| 2019/0004789 A1* | 1/2019 | Mills | H04L 9/3239 |
| 2019/0138294 A1 | 5/2019 | Smith et al. | |

OTHER PUBLICATIONS

"Amazon Linux AMI," 2021, 7 pages, Amazon Web Services, Inc., downloaded from https://aws.amazon.com/amazon-linux-ami/ on Nov. 9, 2021.

Nicole Berdy, "Device provisioning: Identity attestation with TPM," Nov. 7, 2017, 7 pages, downloaded from on https://azure.microsoft.com/en-us/blog/device-provisioning-identity-attestation-with-tpm/ on Nov. 9, 2021.

"TPM 2.0 Library," 2021, 10 pages, Trusted Computing Group, downloaded from on https://trustedcomputinggroup.org/resource/tpm-library-specification/ Nov. 9, 2021.

Chao Zhang, "Truxen: A Trusted Computing Enhanced Blockchain," 2019, pp. 1-17, Computer Science, ArXiv.

Lei Zhou et al., "Cssp: The Consortium Blockchain Model for Improving the Trustworthiness of Network Software Services," 2017, pp. 101-107, 2017 IEEE International Symposium on Parallel and Distributed Processing with Applications and 2017 IEEE International Conference on Ubiquitous Computing and Communications (ISPA/IUCC), IEEE.

Supplementary European Search Report, EP App. No. 19933636.3, Jun. 7, 2022, 8 pages.

* cited by examiner

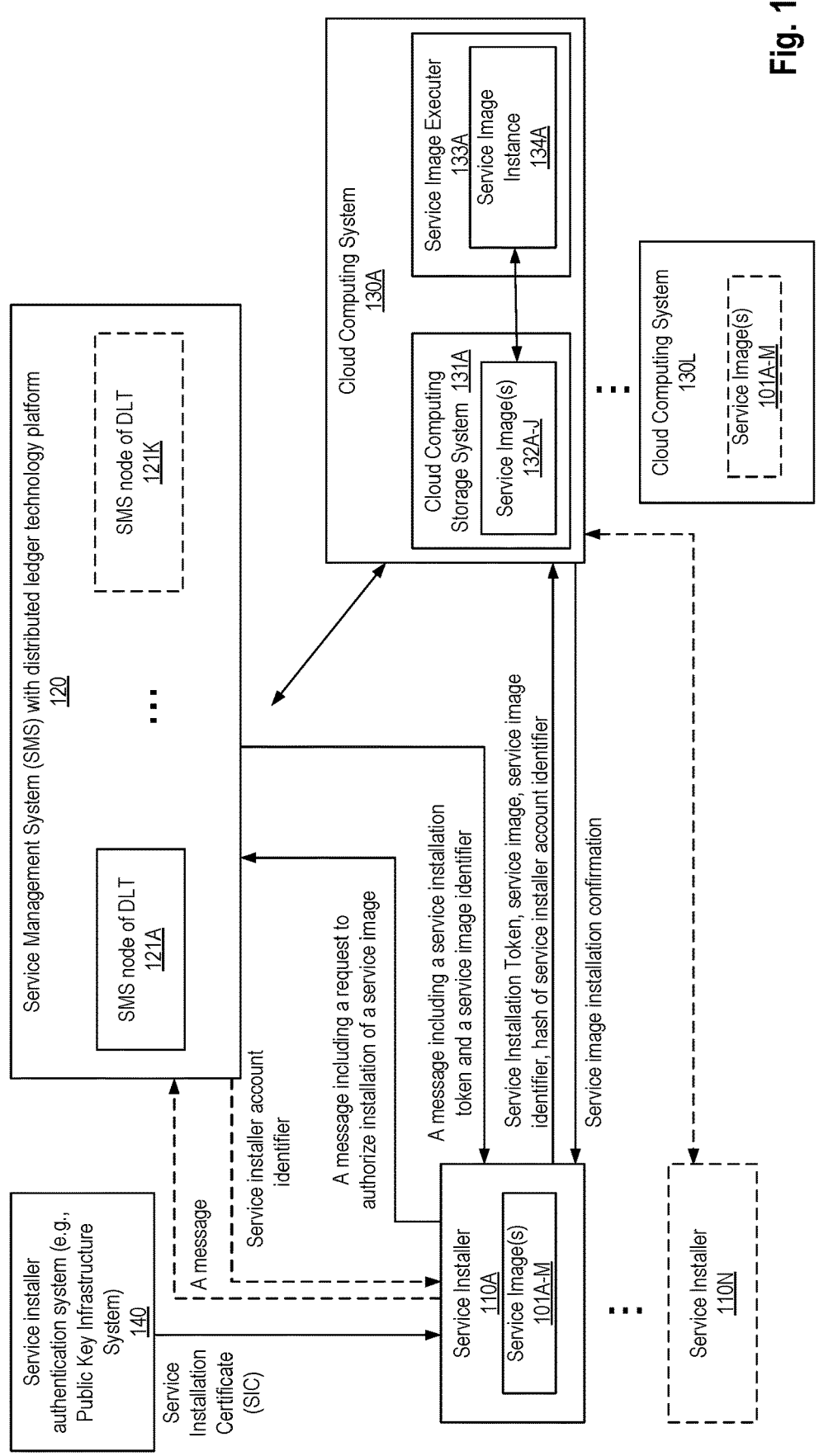

METHOD AND SYSTEM FOR SERVICE IMAGE DEPLOYMENT IN A CLOUD COMPUTING SYSTEM BASED ON DISTRIBUTED LEDGER TECHNOLOGY

CROSS-REFERENCE TO RELATED APPLICATIONS

This application is a National stage of International Application No. PCT/SE2019/050598, filed Jun. 20, 2019, which is hereby incorporated by reference.

TECHNICAL FIELD

Embodiments of the invention relate to the field of distributed ledger technology; and more specifically, to image deployment in a cloud computing system based on distributed ledger technology.

BACKGROUND

In cloud computing systems, several instances of an application can be deployed on one or more servers. The instances of the application are typically used to offer a service to users of the cloud computing system. Each instance of the application is comprised of program code that can be referred to as an image or service image and which separately executes on one or multiple servers of the cloud computing system. Instances of the application may be deployed as a virtual machine or as a container. The service image can include program code that represents computing, networking, and storage services offered by the cloud computing system or another service offered by a third party using the cloud computing system.

Proper and secure provisioning of service images on a cloud computing system is critical to ensure reliable and secure service to users of the applications. For example, an unauthorized image or corrupted image installed into a cloud computing system can compromise users' data as well as the resources of the cloud computing system.

Some mechanisms exist for ensuring images deployed on a cloud computing system are legitimate and authenticated prior to being executed. In some mechanisms, cloud computing systems support and maintain a collection of attested virtual operating system images and of which they control the providence. If a user of the cloud computing system uses one of these images, they have a high probability of avoiding an image that has been compromised by an attacker. However, any service image that has not been attested or verified and which is executed on cloud computing system after the system has booted could have been altered by an attacker.

In some mechanisms, the cloud computing system provider relies on user login credentials (e.g., user name/password) to authenticate the user installing a new service image. In these mechanisms, when the user's account is compromised without their knowledge (e.g., with a malicious entity having access to the user login credentials), a malicious or corrupted image can be installed on the cloud computing system, allowing an attacker to harvest information about the application or disrupt the operation of the cloud computing system.

Some mechanisms rely on Trusted Computing Group Trusted Platform Module (TPM) standard for authenticating and validating service images. TPM provides a collection of services for attesting validity and authentication of service images at various levels in the stack (boot loader, operating system, application). TPM depends on a Trusted Third Party (TTP) which maintains a database of trusted image hashes. One issue with this procedure is how the image hash ends up in the database. An attacker can compromise the Continuous Integration/Continuous Deployment (CICD) pipeline of the service provider and can insert the hash for a bogus service image or, if they merely wanted to disrupt the service provider's operation, a bogus hash. In the first case, the attacker would be in a position to masquerade as the service and bilk the user of the service out of information and perhaps money, while in the second, they would be able to prevent the service from operating properly. Another problem is that the system managing the database storing the hashes is envisioned as a centralized entity. While scalability techniques are well-known for ensuring that a centralized database has enough availability, a centralized system may encounter difficulties with keeping records synchronized in a network of highly distributed datacenters.

SUMMARY

One general aspect includes a method performed by a network node, the method including: receiving, from a service installer, a first signed message including a request to authorize installation of a service image, a service image identifier, a service installer account identifier, and one or more hashes of the service image; and responsive to determining, based on the service installer account identifier and a distributed ledger, that the service installer is authorized to install a service image identified with the service image identifier in a cloud computing system, performing the following: recording the one or more hashes of the service image in a list of valid service images of the distributed ledger; transmitting, to the service installer, a first message including a first service installation token and the service image identifier, where the service installation token causes the service installer to install the service image in the cloud computing system.

One general aspect includes a network node including: one or more processors; and non-transitory computer readable storage media that stores instructions, which when executed by the one or more processors cause the network node to receive, from a service installer, a first signed message including a request to authorize installation of a service image, a service image identifier, a service installer account identifier, and one or more hashes of the service image; and responsive to determining, based on the service installer account identifier and a distributed ledger, that the service installer is authorized to install a service image identified with the service image identifier in a cloud computing system, perform the following: record the one or more hashes of the service image in a list of valid service images of the distributed ledger; and transmit (322), to the service installer, a first message including a first service installation token and the service image identifier, where the service installation token causes the service installer to install the service image in the cloud computing system.

BRIEF DESCRIPTION OF THE DRAWINGS

The invention may best be understood by referring to the following description and accompanying drawings that are used to illustrate embodiments of the invention. In the drawings:

FIG. 1 illustrates a block diagram of an exemplary system that can be used for providing authenticated service image deployment in accordance with some embodiments.

DETAILED DESCRIPTION

Figure 2A:
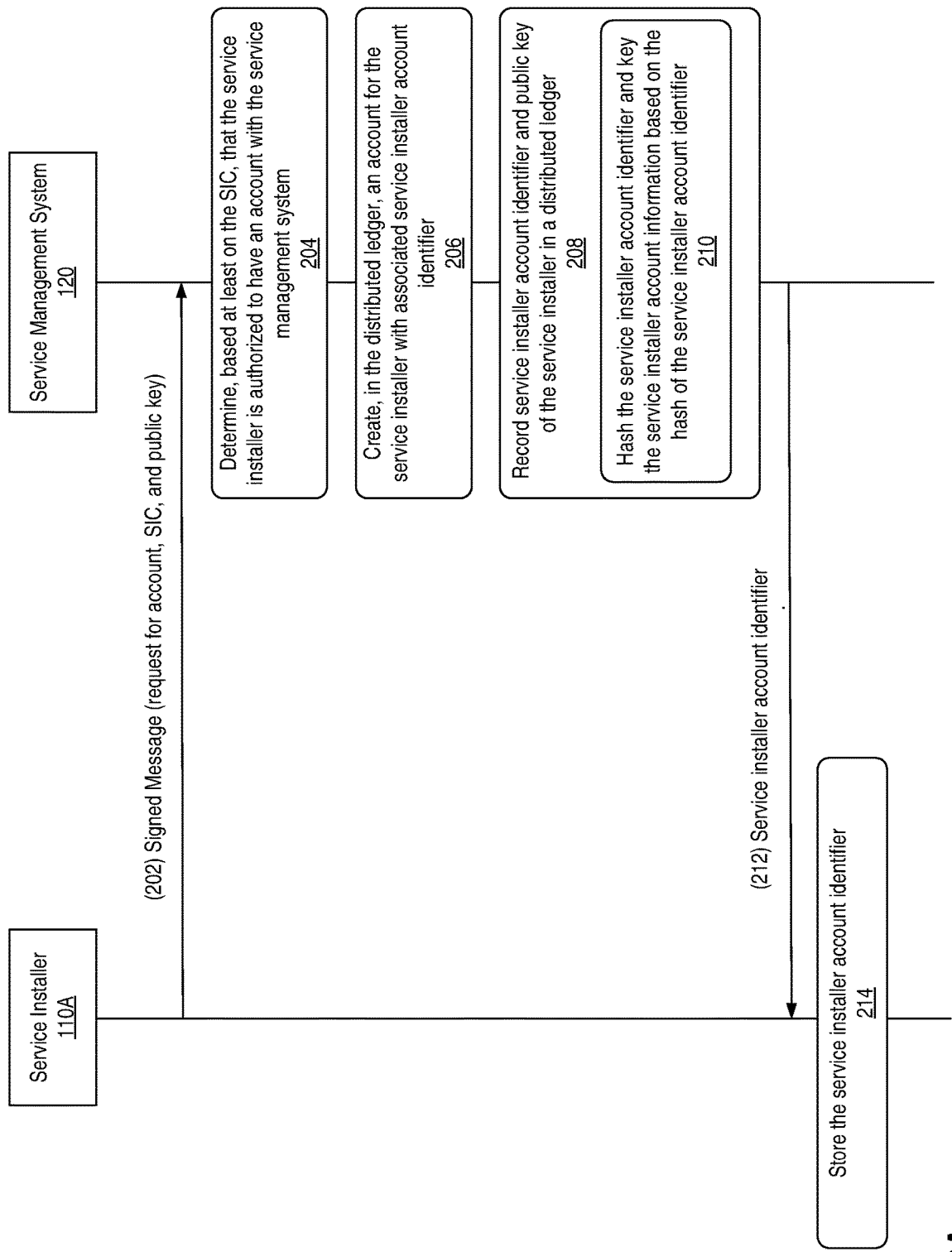
FIG. 2A illustrates a block diagram of exemplary transactions between a service installer and a service management system for obtaining a service installer account, in accordance with some embodiments.

The following description describes methods and apparatus for image deployment in a cloud computing system based on distributed ledger technology. In the following description, numerous specific details such as logic implementations, operation codes (opcodes), means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments presented herein describe a mechanism of image deployment in a cloud computing system based on distributed ledger technology. The mechanisms described herein present significant advantages with respect to previous image deployment mechanisms. In the embodiments presented herein a service installer establishes an account in a distributed ledger (e.g., a permissioned blockchain that is owned and maintained by a group of service installers). The distributed ledger acts as a service management system for the service providers. When a service installer/provider installs a new image, a hash of the image (including hashes of any dynamic link libraries and other files relevant to the application's initial execution) is recorded into the distributed ledger (e.g., blockchain). The service image executer performs a check of all files of the service image prior to scheduling the service image for execution based on the hashes stored in the distributed ledger for that service image.

The solution provides a mechanism for installing service image files into a cloud computing system (e.g., a data center) where the service provider can record proof of providence so that the providence of a service image can be validated before booting/executing the service image. The solution presented herein applies to applications packaged in any form, virtual machines, containers, or simple application binaries, and encompasses configuration files and dynamic link libraries as well as the main application image.

FIG. 1 illustrates a block diagram of an exemplary system that can be used for providing authenticated service image deployment in accordance with some embodiments. The system 100 includes a set of service installer(s) 110A-N, a service management system (SMS) 120, a set of cloud computing system(s) 130A-L, and a service installer authentication system 140.

The service installer 110A-N are operative to manage the lifecycle of applications (herein generally referred to as a service) deployed on one or more cloud computing systems. Each one of the service installers 110A-N is operative to request installation, update, or removal of a service image in the cloud computing systems 130A-L. In some embodiments, a service installer can be a continuous integration and delivery (CI/CD) pipeline, an orchestration system, an Operations Support System (OSS), or any other service management system, and is generically designated herein as the Service Installer (SI). Each service installer can include or have access to a set of service images. In the following description, the operations herein will be described with respect to a single service installer 110A from the set of service installers 110A-N in the interest of simplifying the description and should not be considered as a limitation of the present embodiments. The system 100 may include one or several service installer(s) without departing from the scope of the present inventive concept. The service installer 110A may store or have access to a set of one or more service images 101A-M.

The SMS 120 is operative to receive requests for installation of the service images and can authenticate and authorize the installation, uninstallation of service images in one or more of the cloud computing systems. The SMS 120 includes multiple distributed SMS nodes 121A-K. The SMS 120 is built based on a distributed ledger technology and is operative to record information regarding the service images in the distributed ledger. In some embodiments, each one of the SMS nodes 121A-K can include distributed ledger technology that allows recordation of data in distributed ledger. In some embodiments, the distributed ledger is a permissioned distributed ledger. In some embodiments, the distributed ledger is a permissioned blockchain.

The set of cloud computing systems 130A-L include computing, networking and storage resources that are distributed across multiple network devices. In some embodiments, the SMS nodes 121A-K, and/or the service installers 110A-N can be part of the cloud computing systems 130A-L. In other embodiments, the SMS nodes 121A-K or the service installers 110A-N can be separate from the cloud computing system. For example, the service installers 110A-N can be third party service providers that are not part of a cloud computing system but instead offer one or more service(s) to users through the execution of their service image on physical resources of one or several of the cloud computing system(s) 130A-L.

The service installer authentication system 140 is a service that allows users to obtain a service installer certificate. The service installation certificate allows to prove that the holder of the service installation certificate is allowed to use the service management system and obtain an account to install one or more services on cloud computing systems. Upon authentication that the service installer 110A is a legitimate owner of the public key from the public/private cryptographic keys and that the service installer 110A is authorized to use the SMS 120 to install service images in the cloud computing system(s) 130A-L, the service installer authentication system 140 transmits a service installation certificate to the service installer 110A. The service installation certificate allows to prove that the service installer 110A, which is holds the private/public key pair, is authorized to obtain an account with the SMS 120 to install service images on one or more cloud computing systems 130A-L. In some embodiments, the service installer authentication system 140 is a based on public key infrastructure (PKI). In some embodiments, the service installation certificate of the service installer 110A is long-lived and is obtained prior to any image being generated and installed.

The operations of the multiple components of the system in FIG. 1 will be described in further details below with reference to FIG. 2A-D.

FIG. 2A illustrates a block diagram of exemplary transactions between a service installer and a service management system for obtaining a service installer account, in accordance with some embodiments.

At operation 202, the service installer 110A transmits a signed message to the SMS 120. The signed message includes a request for an account, a service installation certificate (SIC), and a public key of the service installer 110A. The message is signed with the private key of the service installer 110A. The private and public keys of the service installer 110A are a pair of public/private cryptographic keys determined based on asymmetric cryptographic mechanisms. The SMS 120 receives from the service installer 110A the signed message. At operation 204, the SMS 120 determines, based at least in part on the service installation certificate, whether the service installer 110A is authorized to have an account with the SMS 120. The determination at operation 204 may include determining, based on the public key of the service installer 110A that the signature of the received message is valid. The determination can further include determining based on the service installation certificate that the service installer 110A is authorized to obtain an account in the distributed ledger of the SMS 120.

In response to determining that the service installer is not authorized to have an account at the SMS, the SMS 120 denies the account creation. In some embodiments, the SMS 120 may transmit a response to the service installer 110A with a denial of account creation indication.

Alternatively, in response to determining that the service installer 110A is authorized to have an account at the SMS 120, the flow of operations moves to operation 206-210. At operation 206, the SMS 120 creates, in a distributed ledger, an account for the service installer 110A. The account is identified with a service installer account identifier that is unique to the service installer 110A. In some embodiments, the service installer account identifier can be the public key of the service installer 110A or a hash of the public key of the service installer 110A. In other embodiments, other types of unique identifiers can be used to uniquely identify the service installers 110A-N in the SMS 120. For example, the service installer account identifier can be a random string generated to act as an identifier of the service installer account.

At operation 208, the SMS 120 records in the distributed ledger, the service installer account identifier and the public key of the service installer 110A. In some embodiments, the SMS 120 may record a hash of the service installer account identifier in the distributed ledger. In other embodiments, the hash of the service installer account identifier is not recorded in the distributed ledger. In some embodiments, at operation 210, the SMS 120 may hash the service installer account identifier and may store, in the distributed ledger, the account information of the service installer and identifier the account information using the hash of the service installer account identifier as a key. The SMS 120 transmits, at operation 212, to the service installer 110A, the service installer account identifier. Upon receipt of the service account identifier, the service installer 110A securely stores the service installer account identifier, at operation 214. The service installer account identifier can be used by the service installer 110A to request installation of service images in one or more cloud computing systems that are managed via the SMS 120.

Figure 2B:
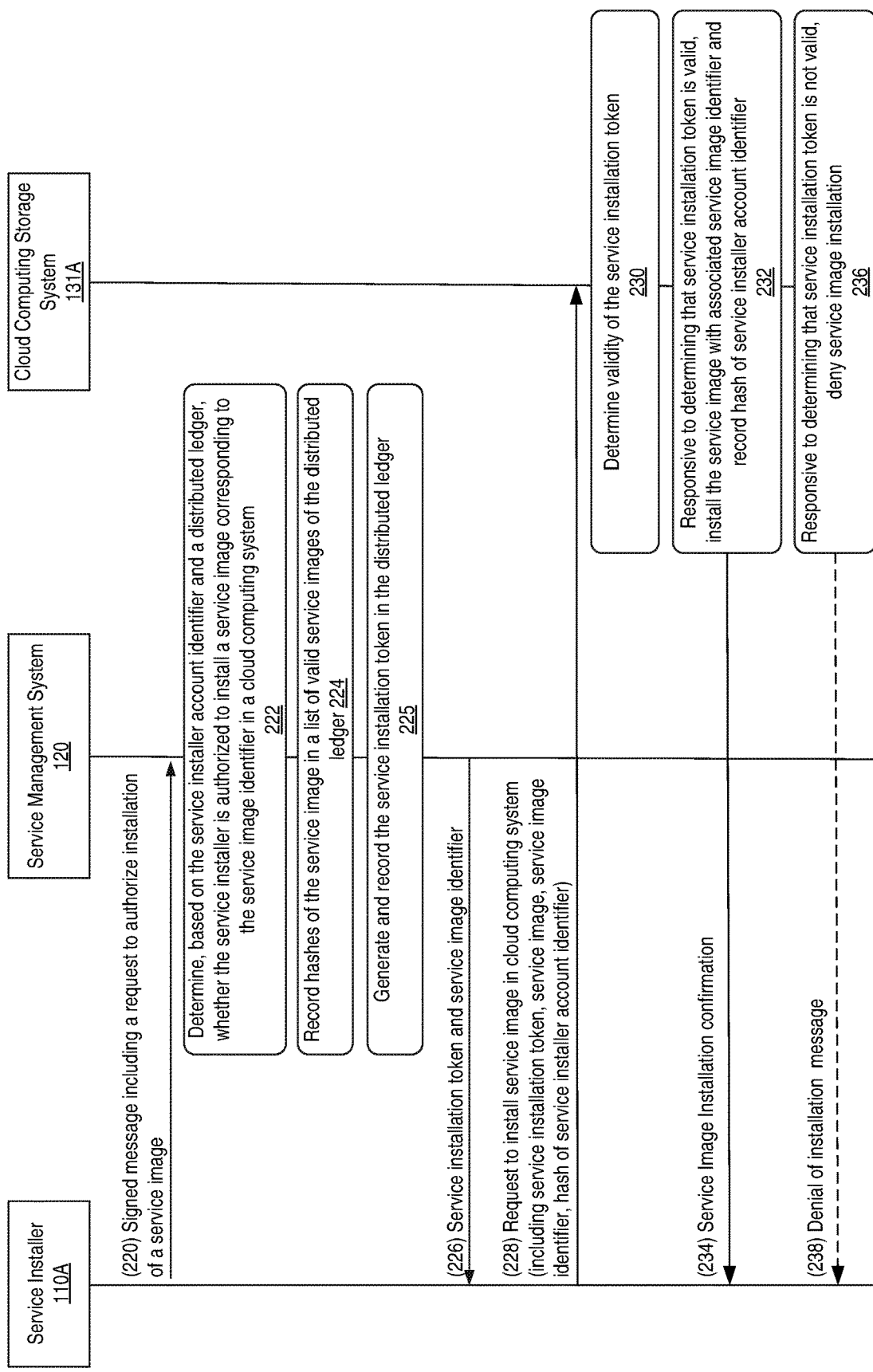
FIG. 2B illustrates a block diagram of exemplary operations for authorizing installation of a service image, in accordance with some embodiments.

FIG. 2B illustrates a block diagram of exemplary operations for authorizing installation of a service image, in accordance with some embodiments. Upon creation of an account and obtaining a service installer account identifier from the SMS 120, the service installer 110A is operative to install one or more service images on the cloud computing systems. These operations will be described with the exemplary service installer 110A and the cloud computing storage system 131A. In some embodiments, the service installer 110A may request service installation on any one of multiple cloud computing systems 130A-L.

At operation 220, the service installer 110A transmits a first signed message including a request to authorize installation of a service image. The first signed message includes the request to authorize the installation, a service image identifier, the service installer account identifier, and one or more hashes of the service image. In some embodiments, the hashes of the service image results from hashing one or multiple files that form the code which when executed on a server of the cloud computing system result in an application offering a service to a user. The files may include configuration files that are used to configure the service image. The configuration of the service image based on these files is performed prior to the hashing of the image files and the generation of the hashes. The service image identifier identifies the version of the service image for which installation authorization is sought. In some embodiments, the service installer 110A may have several active versions of service images that are installed or to be installed in a cloud computing system. In some embodiments, the signed message further includes a public key of the service installer 110A. In other embodiments, for example when the service image identifier is the public key of the service installer 110A, the signed message may not include the public key of the service installer 110A. The first signed message is signed with the private key of the service installer 110A.

The SMS 120 receives the first signed message. At operation 222, the SMS 120 determines, based on the service installer account identifier and a distributed ledger, whether the service installer 110A is authorized to install a service image identified with the service image identifier in a cloud computing system. In some embodiments, to determine whether the service installer is authorized to install a service image, the SMS 120 may determine whether the service installer account identifier is associated with a legitimate account in the distributed ledger and the SMS 120 may further determines whether a public key corresponding to the service installer account identifier that is stored in the distributed ledger validates a signature of the signed message in which the request for authorizing installation was received. In some embodiments, upon determining, that the service installer account identifier included in the request is associated with a legitimate account in the distributed ledger and that the public key of the service installer 110A that is associated with the service installer identifier can be used to validate the signature of the signed message, the SMS 120 determines that the service installer 110A is authorized to install a service image. In other embodiments, upon determining, that the service installer account identifier included in the request is not associated with a legitimate account in the distributed ledger or that the public key of the service installer 110A that is associated with the service installer identifier cannot be used to validate the signature of the signed message, the SMS 120 determines that the service installer 110A is not authorized to install a service image.

Upon determining that the service installer 110A is not authorized to install a service image, the SMS 120 denies the image service installation. In some embodiments, the SMS 120 may transmit a message including the denial of image service installation to the service installer 110A. In other embodiments, no message is sent. In some embodiments, when a service installation is denied, the SMS 120 may report and/or record in a blacklist the identity of the service installer 110A as a malicious service installer.

Upon determining that the service installer 110A is authorized to install the service image, the SMS 120 performs the operations 224-226. At operation 224, the SMS 120 records the hashes of the service image in a list of valid service images of the distributed ledger. At operation 225, the SMS 120 further generates and records a service installation token in the distributed ledger associated with the service installer identifier and with the service image identifier. The SMS 120 transmits, to the service installer 110A at operation 226, a second message including a service installation token and the service image identifier. The service installation token causes the service installer 110A to install the service image in the cloud computing system.

Upon receipt of the service installation token, the service installer 110A, at operation 228 transmits a request to install the service image to a cloud computing system. The request includes the service installation token, the service image, the service image identifier, and a hash of the service installer account identifier. The request is sent to the cloud computing storage system 131A in which the service image is to be installed. In some embodiments, the request to install the service is transmitted in a message signed with the private key of the service installer 110A. Upon receipt of the request, the cloud computing storage system 131A, determines the validity of the service installation token, at operation 230. In some embodiments, determining the validity of the service installation token may include transmitting a request to the SMS 120 to check the service installation token against data recorded in the distributed ledger for the service installer 110A and for the service image identifier. The SMS 120 may retrieve from the distributed ledger the stored service installation token for the service installer 110A as identified by the service installer identifier and for the service image as identified with the service image identifier. In some embodiments, determining the validity of the service installation token may further include determining that the message received from the service installer 110A can be used to authenticate the service installer 110A, e.g., the signed message including the request is valid. In response to determining that the service installation token is valid, the cloud computing storage system 131A, at operation 232 installs the image with the associated service image identifier. The cloud computing storage system 131A further records the hash of the service installer account identifier. Upon determination that the installation is complete, the cloud computing storage system 131A transmits a confirmation of installation to the service installer 110A, at operation 234. In some embodiments, the cloud computing storage system 131A, at operation 236 may determine that the service installation token is not a valid token, and deny installation of the service image. In some embodiments, the cloud computing storage system 131A, at operation 238 may transmit a denial of service image installation message to the service installer 110A to indicate that the service image was not installed.

Figure 2C:
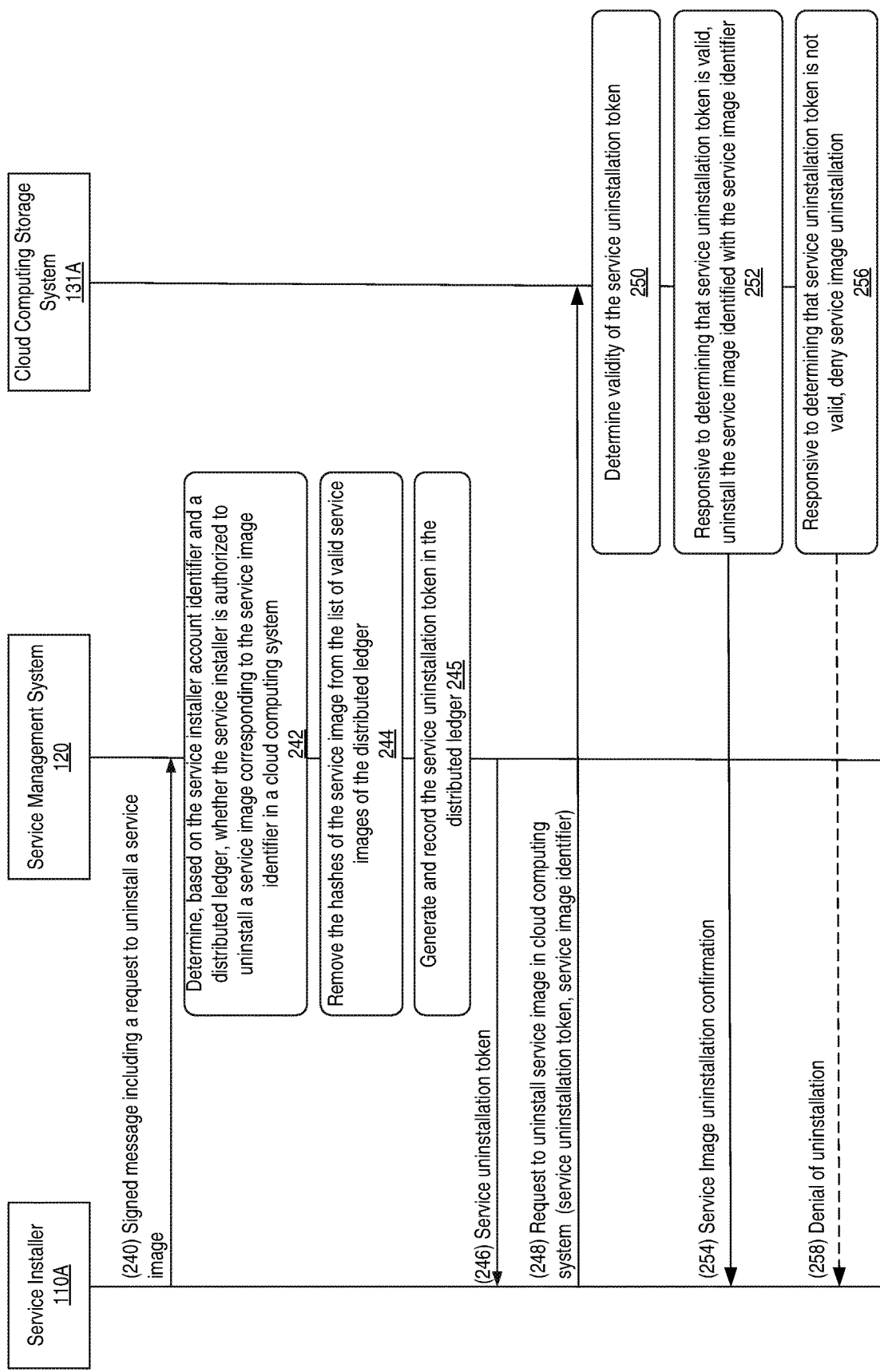
FIG. 2C illustrates a block diagram of exemplary operations for authorizing uninstallation of a service image, in accordance with some embodiments.

FIG. 2C illustrates a block diagram of exemplary operations for authorizing uninstallation of a service image, in accordance with some embodiments. In some embodiments, the service installer 110A may need to uninstall one or multiple service images installed in any of the cloud computing systems 130A-L. The uninstallation process is performed based on an authorization token that is provided to the service installer 110A based on its account in the distributed ledger of the SMS 120 as described with reference to the operations of FIG. 2C.

At operation 240, the service installer 110A transmits to SMS 120 a signed message including a request to authorize uninstallation of a service image previously installed in a cloud computing system. The signed message includes the request to authorize the uninstallation, a service image identifier that uniquely identifies the service image to be uninstalled, and the service installer account identifier that uniquely identifies the service installer 110A in the distributed ledger of the SMS 120. In some embodiments, the service installer 110A may have several active versions of service images that are installed and may transmit in the request to uninstall one or several identifiers of these service images. The service installer 110A may request uninstallation/removal of one or more version of the service images. The signed message is signed with the private key of the service installer 110A.

The SMS 120 receives the signed message. At operation 242, the SMS 120 determines, based on the service installer account identifier and the distributed ledger, whether the service installer 110A is authorized to uninstall the service image identified with the service image identifier. In some embodiments, to determine whether the service installer is authorized to uninstall the service image, the SMS 120 may determine whether the service installer account identifier is associated with a legitimate account in the distributed ledger and the SMS 120 may further determines whether a public key corresponding to the service installer account identifier that is stored in the distributed ledger validates a signature of the signed message in which the request for uninstallation was received. In some embodiments, upon determining, that the service installer account identifier included in the request is associated with a legitimate account in the distributed ledger and that the public key of the service installer 110A that is associated with the service installer account identifier can be used to validate the signature of the signed message, the SMS 120 determines that the service installer 110A is authorized to uninstall the service image. In other embodiments, upon determining, that the service installer account identifier included in the request is not associated with a legitimate account in the distributed ledger or that the public key of the service installer 110A that is associated with the service installer identifier cannot be used to validate the signature of the signed message, the SMS 120 determines that the service installer 110A is not authorized to uninstall a service image.

Upon determining that the service installer 110A is not authorized to uninstall a service image, the SMS 120 denies the image service uninstallation. In some embodiments, the SMS 120 may transmit a message including the denial of image service installation to the service installer 110A. In other embodiments, no message is sent. In some embodiments, when a service installation is denied, the SMS 120 may report and/or record in a blacklist the identity of the service installer as a malicious service installer.

Upon determining that the service installer 110A is authorized to uninstall the service image, the SMS 120 performs the operations 244-246. At operation 244, the SMS 120 removes the hashes of the service image from the list of valid service images of the distributed ledger. At operation 245, the SMS 120 further generates and records the service uninstallation token in the distributed ledger associated with the service installer identifier and with the service image identifier. The SMS 120 transmits, to the service installer 110A at operation 246, a message including the service uninstallation token. The service uninstallation token causes the service installer 110A to uninstall the service image in the cloud computing system.

Upon receipt of the service uninstallation token, the service installer 110A at operation 248, transmits a request to uninstall the service image to the cloud computing storage system 131A. The request includes the service uninstallation token and the service image identifier. The request is sent to the cloud computing storage system 131A in which the service image is to be uninstalled. In some embodiments, the request to uninstall the service is transmitted in a message signed with the private key of the service installer 110A. Upon receipt of the request, the cloud computing storage system 131A, determines the validity of the service uninstallation token, at operation 250. In some embodiments, determining the validity of the service uninstallation token may include transmitting a request to the SMS 120 to check the service uninstallation token against data recorded in the distributed ledger for the service installer 110A and for the service image identifier. The SMS 120 may retrieve from the distributed ledger the stored service uninstallation token for the service installer 110A as identified by the service installer identifier and for the service image as identified with the service image identifier. In some embodiments, determining the validity of the service uninstallation token may further include determining that the message received from the service installer 110A can be used to authenticate the service installer 110A, e.g., the signed message including the request is valid. In response to determining that the service uninstallation token is valid, the cloud computing storage system 131A uninstalls, at operation 252, the image identified with the service image identifier. The cloud computing storage system 131A further records the hash of the service installer account identifier. Upon determination that the uninstallation is complete, the cloud computing storage system 131A transmits a confirmation of uninstallation to the service installer 110A, at operation 254. In some embodiments, the cloud computing storage system 131A may determine, at operation 256, that the service uninstallation token is not a valid token, and denies uninstallation of the service image. In some embodiments, the cloud computing storage system 131A may transmit, at operation 258, a denial of service image uninstallation message to the service installer 110A to indicate that the service image was not uninstalled.

Figure 2D:
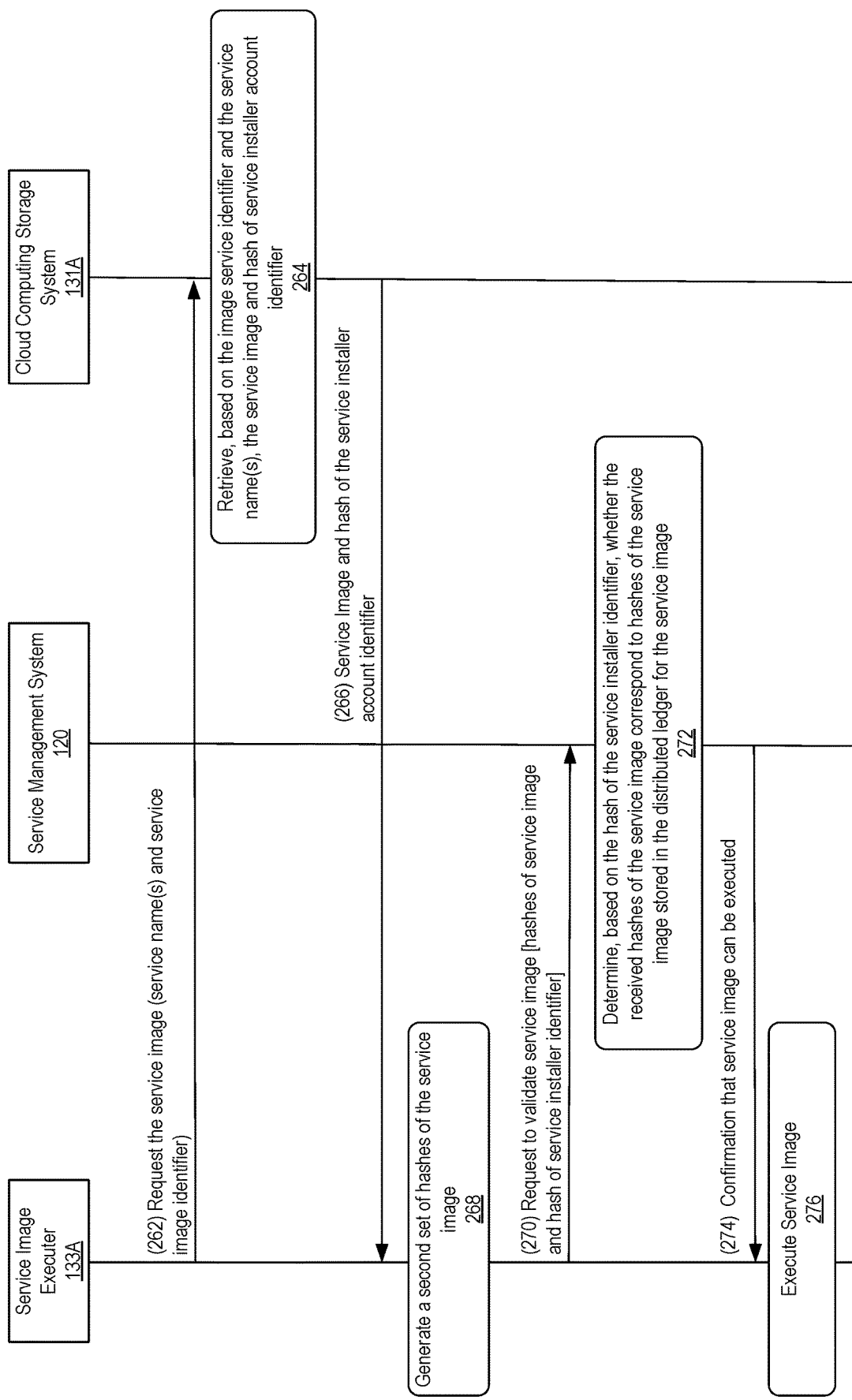
FIG. 2D illustrates a block diagram of exemplary operations for secure execution of a service image, in accordance with some embodiments.

FIG. 2D illustrates a block diagram of exemplary operations for secure execution of a service image, in accordance with some embodiments. Once the service image is stored in the cloud computing system, for example, in the cloud computing storage system 131A and the hashes of the service image are recorded in the distributed ledger with the service installer account identifier, the service image can be securely uploaded and executed by one or more service image executer. For example, a service image executer 133A, which may be part of the cloud computing system 130A or external to the cloud computing system, may need to retrieve the service image from the cloud computing storage system 131A and validate the service image prior to the execution of the service image. In some embodiments, the validation of the service image is performed based on the operations of FIG. 2D.

At operation 262, the service image executer 133A transmits, to the cloud computing storage system 131A, a request for the service image. The request includes the service name(s) and service image identifier. The cloud computing storage system 131A retrieves the service image based on the image service identifier and the service names at operation 264. The cloud computing storage system 131A transmits the service image and a hash of the service installer account identifier to the service image executer 133A at operation 266. Upon receipt of the service image, the service image executer 133A generates, at operation 268, a second set of one or more hashes of the received service image.

The service image executer 133A transmits, at operation 270, a request to the SMS 120, to validate the service image prior to executing the service image. The SMS 120 receives, from a service image executer, the request to validate a service image. The request includes the hash of the service installer account identifier and the second set of one or more hashes of the service image as retrieved by the service image executer from the cloud computing system. At operation 272, the SMS 120 determines, based on the hash of the service installer account identifier, whether the second set of one or more hashes of the service image corresponds to the one or more hashes of the service image that are stored in the distributed ledger. In response to determining that the second set of one or more hashes of the service image corresponds to the one or more hashes of the service image that are stored in the distributed ledger, the SMS 120 transmits, at operation 274, a confirmation, to the service image executer, that the service image can be executed. Upon receipt of the confirmation the service image executer 133A can securely execute, at operation 276, the service image.

In some embodiments, determining the hashes of the service image can be performed based on a mechanism of a trusted platform module (TPM) in the service image executer 133A. The TPM creates a certificate based on the private key of the service image and the hash(es) of the service image and signs the certificate with an attestation identity key SKAIK. In these embodiments, the service image executer can further send to the SMS 120 the certificate generated through the TPM to enable authentication of the service image. The SMS 120 verifies the certificate and the hashes of the service image received from the service image executer and based on the information recorded in the distributed ledger for the service image. Upon determination that the certificate is valid and that the hashes of the service image match the recorded hashes, the service image is validated for execution at the service image executer 133A.

The operations in the flow diagrams will be described with reference to the exemplary embodiments of FIGS. 1-2D. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3A:
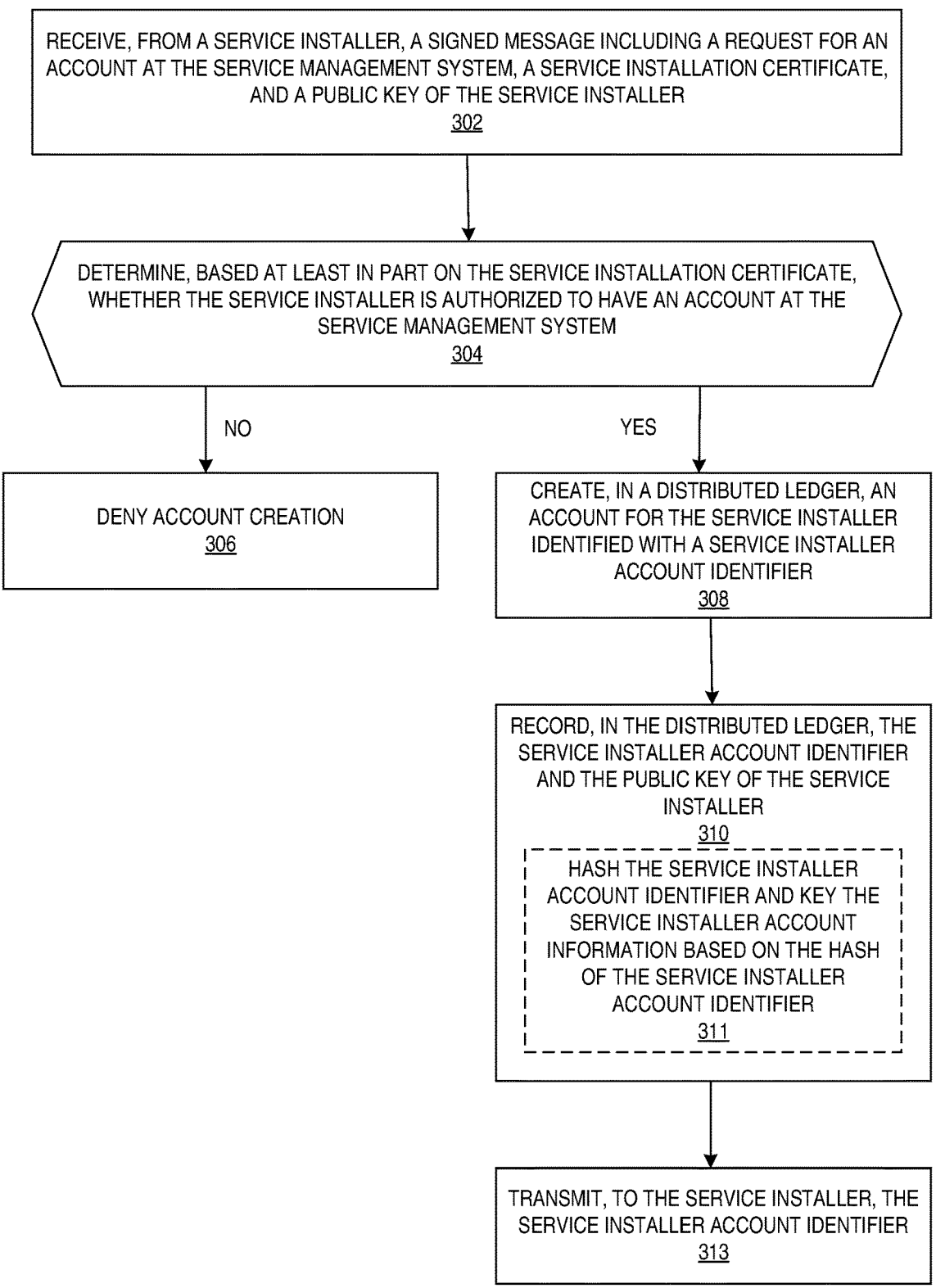
FIG. 3A illustrates a flow diagram of exemplary operations for obtaining a service installer account, in accordance with some embodiments.

FIG. 3A illustrates a flow diagram of exemplary operations for obtaining a service installer account, in accordance with some embodiments. The operations of FIG. 3A can be performed by the SMS 120. In an example, when the SMS 120 is implemented as a plurality of SMS nodes, the operations of FIG. 3A can be performed by an SMS node (e.g., SMS node of the DLT 121A) that is part of the SMS 120. At operation 302, the service management system e.g., SMS 120, receives from a service installer, e.g., service installer 110A, a signed message. The signed message includes a request for an account at the SMS 120, a service installation certificate, and a public key of the service installer. At operation 304, the SMS 120 determines, based at least in part on the service installation certificate, whether the service installer is authorized to have an account at the SMS 120. The determination at operation 304 may include determining, based on the public key of the service installer 110A that the signature of the received message is valid. The determination can further include determining based on the service installation certificate that the service installer is authorized to obtain an account in the distributed ledger of the SMS.

In response to determining that the service installer is not authorized to have an account at the SMS 120, the SMS 120 denies the account creation, at operation 306. In some embodiments, the SMS 120 may transmit a response to the service installer 110A with a denial of account creation indication.

Alternatively, in response to determining that the service installer is authorized to have an account at the service management system, the flow of operations moves to operation 308-312. At operation 308, the SMS 120 creates, in a distributed ledger, an account for the service installer. The account is identified with a service installer account identifier that is unique to the service installer. In some embodiments, the service installer account identifier can be the public key of the service installer or a hash of the public key of the service installer. In other embodiments, other types of unique identifiers can be used to uniquely identify the service installers 110A-N. For example, the service installer account identifier can be a random string generated to act as an identifier of the service installer account.

At operation 310, the SMS 120 records in the distributed ledger, the service installer account identifier and the public key. In some embodiments, at operation 311, the SMS 120 may hash the service installer account identifier and may store, in the distributed ledger, the account information of the service installer and identifier the account information using the hash of the service installer account identifier as a key. At operation 313, the SMS 120 transmits to the service installer, the service installer account identifier.

Figure 3B:
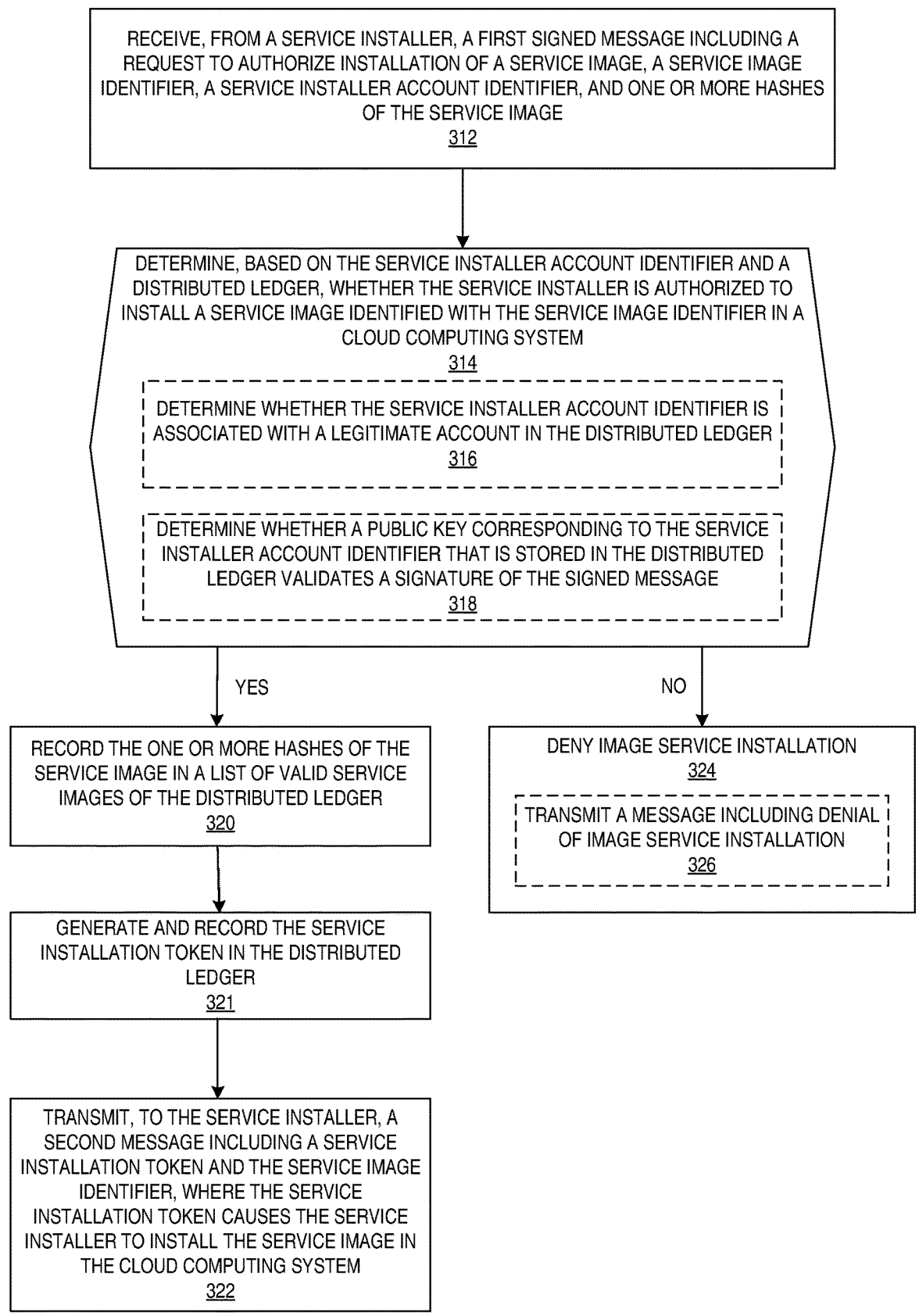
FIG. 3B illustrates a flow diagram of exemplary operations for authorizing installation of a service image, in accordance with some embodiments.

FIG. 3B illustrates a flow diagram of exemplary operations for authorizing installation of a service image, in accordance with some embodiments. At operation 312, the SMS 120 receives, from the service installer 110A, a first signed message including a request to authorize installation of a service image, a service image identifier, a service installer account identifier, and one or more hashes of the service image. In some embodiments, the hashes of the service image results from hashing one or multiple files that form the code which when executed on a server of the cloud computing system result in an application offering a service to a user. The files may include configuration files that are used to configure the service image. The configuration of the service image based on these files is performed prior to the hashing of the image files and the generation of the hashes. The service image identifier identifies the version of the service image for which installation authorization is sought. In some embodiments, the service installer 110A may have several active version of a same service image that are installed or to be installed in a cloud computing system. In some embodiments, the signed message further includes a public key of the service installer 110A. In other embodiments, for example when the service image identifier is the public key of the service installer 110A, the signed message may not include the public key of the service installer 110A.

At operation 314, the SMS 120 determines, based on the service installer account identifier and a distributed ledger, whether the service installer is authorized to install a service image identified with the service image identifier in a cloud computing system. In some embodiments, the SMS 120 determines whether the service installer account identifier is associated with a legitimate account in the distributed ledger, operation 316. The SMS 120 further determines, at operation 318, whether a public key corresponding to the service installer account identifier that is stored in the distributed ledger validates a signature of the signed message in which the request for authorizing installation was received. In some embodiments, upon determining, that the service installer account identifier included in the request is associated with a legitimate account in the distributed ledger and that the public key of the service installer 110A that is associated with the service installer identifier can be used to validate the signature of the signed message, the SMS 120 determines that the service installer is authorized to install a service image. In other embodiments, upon determining, that the service installer account identifier included in the request is not associated with a legitimate account in the distributed ledger or that the public key of the service installer 110A that is associated with the service installer identifier cannot be used to validate the signature of the signed message, the SMS 120 determines that the service installer 110A is not authorized to install a service image.

Upon determining that the service installer 110A is not authorized to install a service image, the SMS 120 denies the image service installation at operation 324. In some embodiments, the SMS 120 may transmit a message including the denial of image service installation to the service installer 110A. In other embodiments, no message is sent. In some embodiments, when a service installation is denied, the SMS 120 may report and/or record in a blacklist the identity of the service installer as a malicious service installer.

Upon determining that the service installer 110A is authorized to install the service image, the SMS 120 performs the following operations 320-322. At operation 320, the SMS 120 records the one or more hashes of the service image in a list of valid service images of the distributed ledger. At operation 321, the SMS 120 further generates and records the service installation token in the distributed ledger associated with the service installer identifier and with the service image identifier. The SMS 120 transmits, to the service installer at operation 322, a second message including a service installation token and the service image identifier. The service installation token causes the service installer 110A to install the service image in the cloud computing system.

Figure 3C:
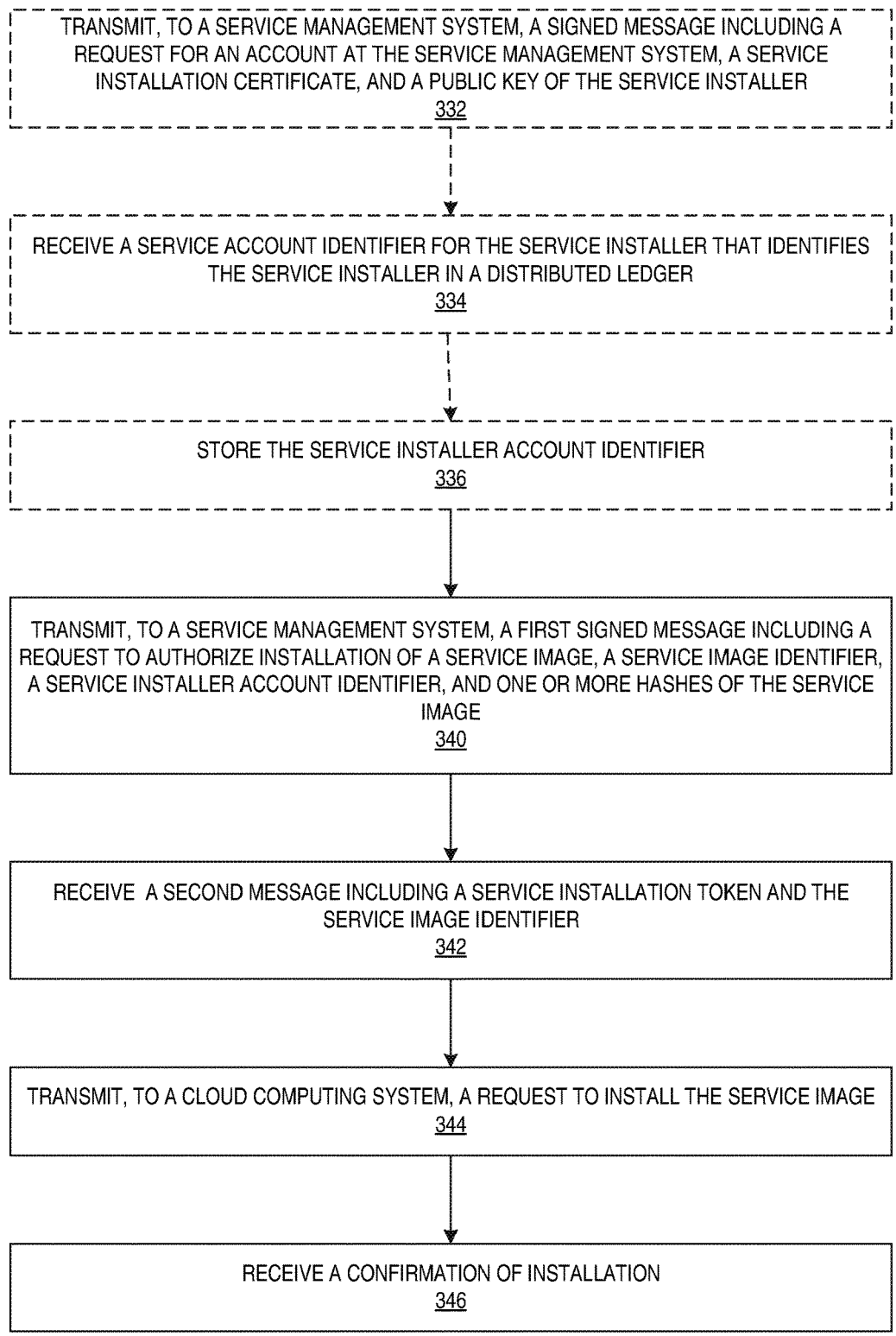
FIG. 3C illustrates a flow diagram of exemplary operations performed by a service installer in accordance with some embodiments.

FIG. 3C illustrates a flow diagram of exemplary operations performed by a service installer in accordance with some embodiments. The service installer 110A transmits, at operation 332, a signed message to the SMS 120. The signed message includes a request for an account, a service installation certificate, and a public key of the service installer 110A. The message is signed with the private key of the service installer. The private and public keys of the service installer 110A are a pair of public/private cryptographic keys determined based on asymmetric cryptographic mechanisms. The service installer 110A receives, at operation 334, the service account identifier that identifies the service installer in a distributed ledger of the service management system. Upon receipt of the service account identifier, the service installer 110A securely stores, at operation 336, the service installer account identifier. The service installer account identifier can be used by the service installer 110A to request installation of service images in one or more cloud computing systems that are managed via the SMS 120.

At operation 340, the service installer 110A transmits a first signed message including a request to authorize installation of a service image. The first signed message includes the request to authorize the installation, a service image identifier, the service installer account identifier, and one or more hashes of the service image. In some embodiments, the hashes of the service image result from hashing one or multiple files that form the code which when executed on a server of the cloud computing system result in an application offering a service to a user. The files may include configuration files that are used to configure the service image. The configuration of the service image based on these files is performed prior to the hashing of the image files and the generation of the hashes. The service image identifier identifies the version of the service image for which installation authorization is sought. In some embodiments, the service installer 110A may have several active versions of service images that are installed or to be installed in a cloud computing system. In some embodiments, the signed message further includes a public key of the service installer 110A. In other embodiments, for example when the service image identifier is the public key of the service installer 110A, the signed message may not include the public key of the service installer 110A. The first signed message is signed with the private key of the service installer 110A.

The service installer receives, at operation 342, a second message including a service installation token and the service image identifier. The service installation token causes the service installer 110A to install the service image in the cloud computing system.

Upon receipt of the service installation token, the service installer 110A transmits, to a cloud computing system, a request to install the service image, at operation 344. The request includes the service installation token, the service image, the service image identifier, and a hash of the service installer account identifier. The request is sent to the cloud computing storage system 131A in which the service image is to be installed. Upon receipt of the request, the cloud computing storage system 131A, determines the validity of the installation token. In response to determining that the service installation token is valid, the cloud computing storage system 131A installs the image with the associated service image identifier. The cloud computing storage system 131A further records the hash of the service installer account identifier. Upon determination that the installation is complete, service installer 110A receives a confirmation of installation, at operation 346. In some embodiments, the cloud computing storage system 131A may determine that the service installation token is not a valid token, and denies installation of the service image. In some embodiments, the cloud computing storage system 131A may transmit a denial of service image installation message to the service installer 110A to indicate that the service image was not installed. In these embodiments, instead of receiving a confirmation of installation, the service installer 110A may receive a denial of installation message from the cloud computing system.

Figure 3D:
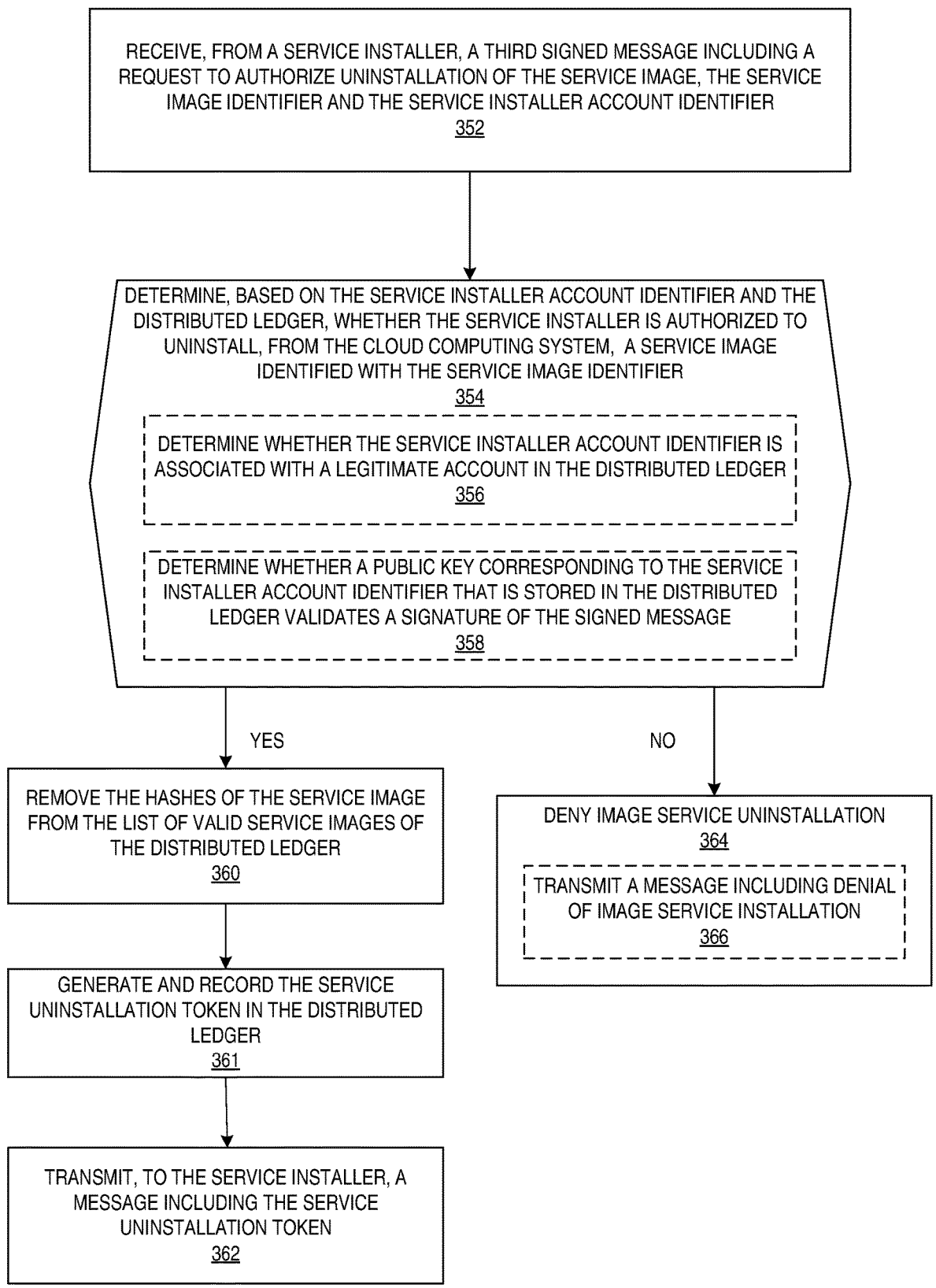
FIG. 3D illustrates a flow diagram of exemplary operations for authorizing uninstallation of a service image, in accordance with some embodiments.

FIG. 3D illustrates a flow diagram of exemplary operations for authorizing uninstallation of a service image, in accordance with some embodiments. At operation 352, the SMS 120 receives, from the service installer 110A, a signed message including a request to authorize uninstallation of the service image that was previously installed in a cloud computing storage system. The signed message further includes a service image identifier and a service installer account identifier. The service image identifier identifies the version of the service image for which uninstallation authorization is sought. In some embodiments, the service installer 110A may have several active versions of a service image that are installed and may transmit one or several identifiers of the services images to request uninstallation.

At operation 354, the SMS 120 determines, based on the service installer account identifier and the distributed ledger, whether the service installer is authorized to uninstall the service image identified with the service image identifier. In some embodiments, the SMS 120 determines whether the service installer account identifier is associated with a legitimate account in the distributed ledger, operation 356. The SMS 120 further determines, at operation 358, whether a public key corresponding to the service installer account identifier that is stored in the distributed ledger validates a signature of the signed message in which the request for authorizing installation was received. In some embodiments, upon determining, that the service installer account identifier included in the request is associated with a legitimate account in the distributed ledger and that the public key of the service installer 110A that is associated with the service installer identifier can be used to validate the signature of the signed message, the SMS 120 determines that the service installer 110A is authorized to uninstall a service image. In other embodiments, upon determining, that the service installer account identifier included in the request is not associated with a legitimate account in the distributed ledger or that the public key of the service installer 110A that is associated with the service installer identifier cannot be used to validate the signature of the signed message, the SMS 120 determines that the service installer 110A is not authorized to uninstall the service image.

Upon determining that the service installer 110A is not authorized to uninstall a service image, the SMS 120 denies, at operation 364, the image service uninstallation. In some embodiments, the SMS 120 may transmit, at operation 366, a message including the denial of image service installation to the service installer 110A. In other embodiments, no message is sent. In some embodiments, when a service installation is denied, the SMS 120 may report and/or record in a blacklist the identity of the service installer as a malicious service installer.

Upon determining that the service installer 110A is authorized to uninstall the service image, the SMS 120 performs the operations 360-362. At operation 360, the SMS 120 removes the hashes of the service image from the list of valid service images of the distributed ledger. At operation 361, the SMS 120 further generates and records the service uninstallation token in the distributed ledger associated with the service installer identifier and with the service image identifier. The SMS 120 transmits, to the service installer 110A at operation 362, a message including a service uninstallation token. The service uninstallation token causes the service installer 110A to uninstall the service image in the cloud computing system.

Figure 3E:
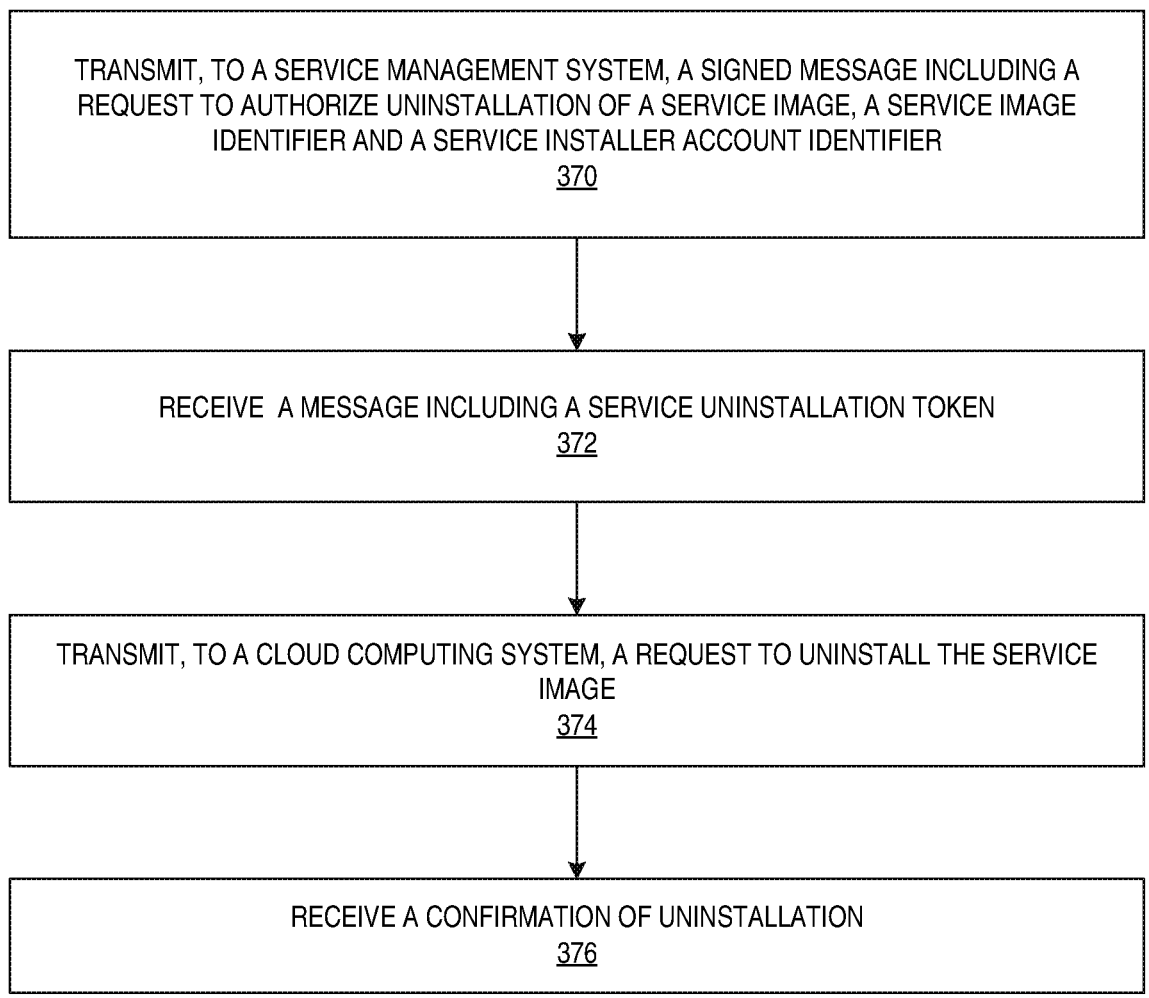
FIG. 3E illustrates a flow diagram of exemplary operations for requesting uninstallation of a service image in accordance with some embodiments.

FIG. 3E illustrates a flow diagram of exemplary operations for requesting uninstallation of a service image in accordance with some embodiments. At operation 370, the service installer 110A transmits a signed message including a request to authorize uninstallation of the service image. The first signed message includes the request to authorize the uninstallation, a service image identifier and the service installer account identifier. The service image identifier identifies the version of the service image for which installation authorization is sought. In some embodiments, the service installer 110A may have several active versions of service images that are installed in a cloud computing system. In some embodiments, the request may include more than one service image identifiers identifying several service images that are to be uninstalled. The signed message is signed with the private key of the service installer 110A.

The service installer receives, at operation 372, a message including a service uninstallation token and the service image identifier. The service uninstallation token causes the service installer 110A to uninstall the service image in the cloud computing system. Upon receipt of the service uninstallation token, the service installer 110A transmits, to a cloud computing system, a request to uninstall the service image, at operation 374. The request includes the service uninstallation token, the service image identifier and a hash of the service installer account identifier. The request is sent to the cloud computing storage system 131A in which the service image is to be uninstalled. Upon receipt of the request, the cloud computing storage system 131A determines the validity of the service uninstallation token. In response to determining that the service uninstallation token is valid, the cloud computing storage system 131A uninstalls the image associated with the service image identifier. Upon determination that the uninstallation is complete, service installer 110A receives a confirmation of uninstallation, at operation 376. In some embodiments, the cloud computing storage system 131A may determine that the service uninstallation token is not a valid token, and denies uninstallation of the service image. In some embodiments, the cloud computing storage system 131A may transmit a denial of service image uninstallation message to the service installer 110A to indicate that the service image was not uninstalled. In these embodiments, instead of receiving a confirmation of uninstallation, the service installer 110A may receive a denial of uninstallation message from the cloud computing system.

Figure 3F:
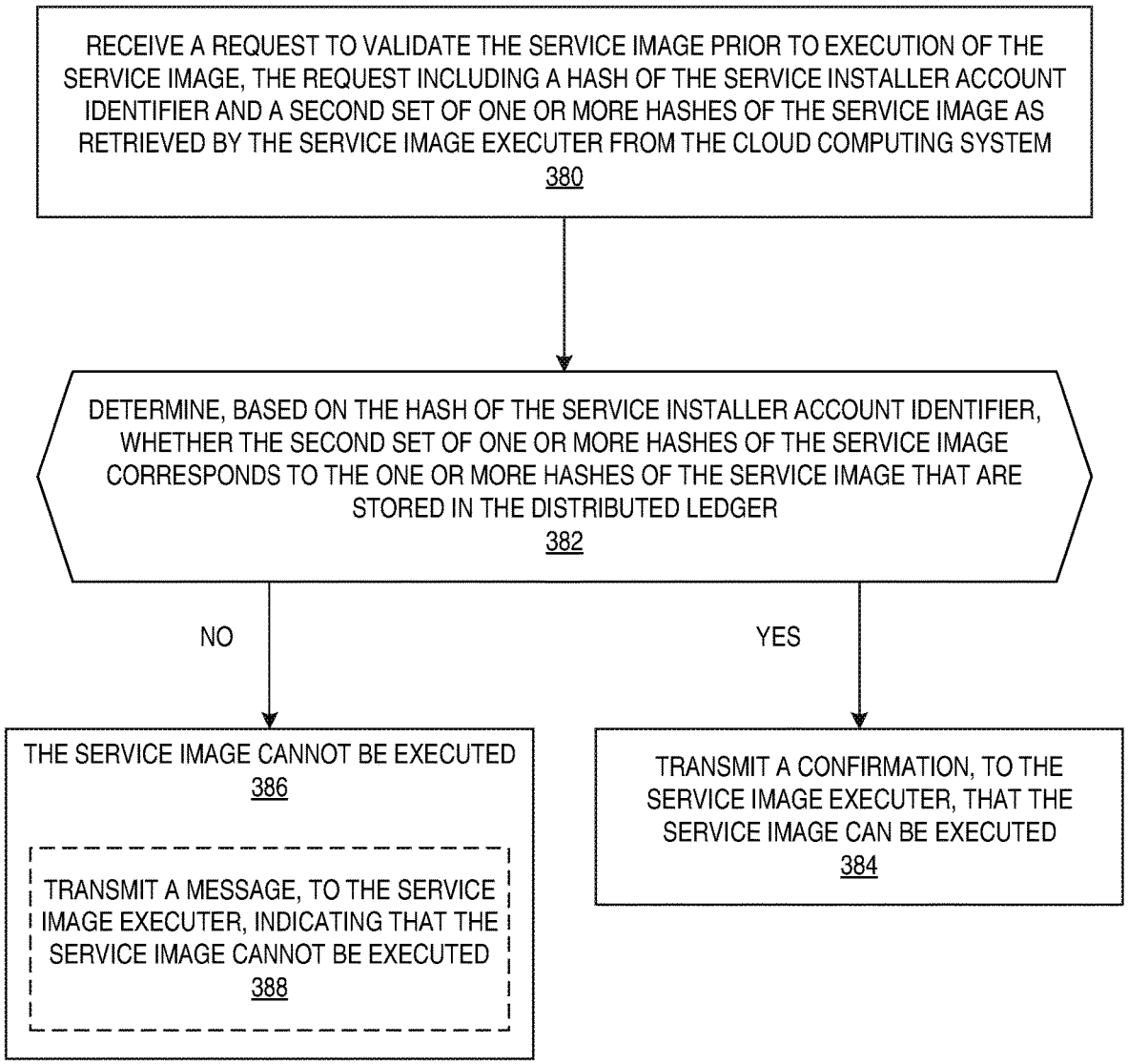
FIG. 3F illustrates a flow diagram of exemplary operations for securely executing a service image, in accordance with some embodiments.

FIG. 3F illustrates a flow diagram of exemplary operations for securely executing a service image, in accordance with some embodiments. Once the service image is stored in the cloud computing system, for example, in the cloud computing storage system 131A and the hashes of the service image are recorded in the distributed ledger with the service installer account identifier, the service image can be securely uploaded and executed by one or more service image executer. For example, a service image executer 133A, which may be part of the cloud computing system 130A or external to the cloud computing system, may need to retrieve the service image from the cloud computing storage system 131A and validate the service image prior to the execution of the service image. In some embodiments, the validation of the service image is performed based on the operations of FIG. 3F.

The service management system receives, at operation 380, a request to the SMS 120, to validate the service image prior to executing the service image. The request includes the hash of the service installer account identifier and the second set of one or more hashes of the service image as retrieved by the service image executer from the cloud computing system. At operation 382, the SMS 120 determines, based on the hash of the service installer account identifier, whether the second set of one or more hashes of the service image corresponds to the one or more hashes of the service image that are stored in the distributed ledger. In response to determining that the second set of one or more hashes of the service image corresponds to the one or more hashes of the service image that are stored in the distributed ledger, the SMS 120 transmits, at operation 384, a confirmation, to the service image executer, that the service image can be executed. Upon receipt of the confirmation the service image executer 133A can securely execute the service image. In some embodiments, in response to determining that the second set of hashes of the service image do not correspond to the hashes of the service image that are stored in the distributed ledger, the SMS 120 determines, at operation 386, that the service cannot be executed. In some embodiments, the SMS 120 may transmit a message to the service image executer, indicating that the service image cannot be executed. In an alternative embodiment, the SMS 120 may not transmit the message.

Architecture:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.).

Figure 4:
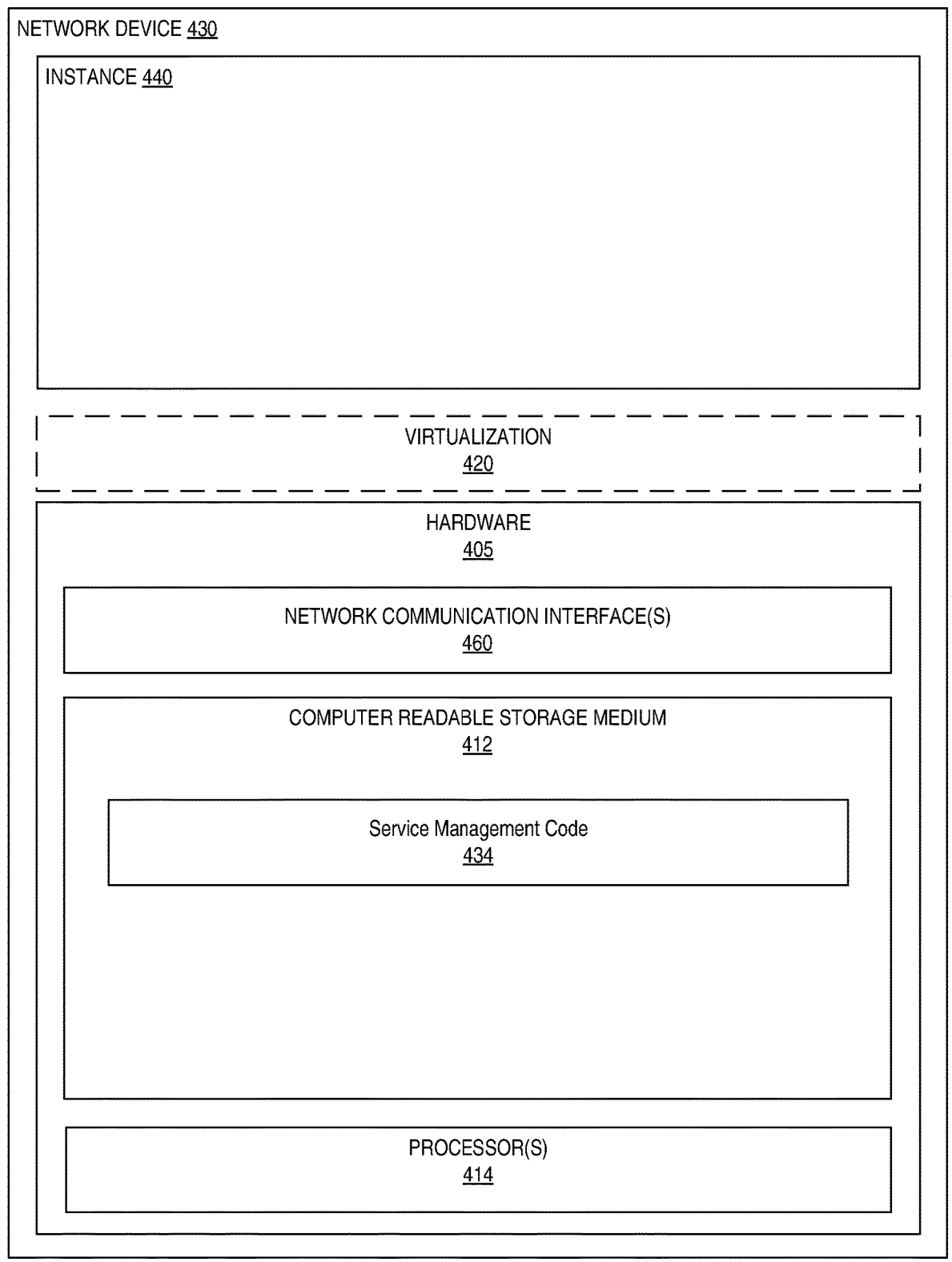
FIG. 4 illustrates a block diagram of a network device in which generation and/or validation of a new genesis block can be performed, in accordance with some embodiments.

FIG. 4 illustrates a block diagram of a network device in which validation of a service image can be performed, in accordance with some embodiments. According to one embodiment, the network device 430 includes hardware 405. Hardware 405 includes network communication interfaces 460 coupled with a computer readable storage medium 412. The computer readable storage medium 412 may further include service management code 434. The service management code 434 when executed on one or more processors 414 causes the network device to perform operations of a service management system described with reference to one or more of FIGS. 1-3F.

While one embodiment does not implement virtualization, alternative embodiments may use different forms of virtualization. For example, in one such alternative embodiment the virtualization layer 420 represents the kernel of an operating system (or a shim executing on a base operating system) that allows for the creation of multiple instances called software containers that may each be used to execute one (or more) of the sets of applications; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 420 represents a hypervisor (sometimes referred to as a virtual machine monitor (VMM)) or a hypervisor executing on top of a host operating system, and each of the sets of applications is run on top of a guest operating system within an instance 440 called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 705, directly on a hypervisor (in which case the unikernel is sometimes described as running within a LibOS virtual machine), or in a software container, embodiments can be implemented fully with unikernels running directly on a hypervisor represented by virtualization layer 420, unikernels running within software containers represented by instances, or as a combination of unikernels and the above-described techniques (e.g., unikernels and virtual machines both run directly on a hypervisor, unikernels and sets of applications that are run in different software containers).

The instantiation of the one or more sets of one or more applications, as well as virtualization if implemented, are collectively referred to as software instance(s). Each set of applications, corresponding virtualization construct if implemented, and that part of the hardware that executes them (be it hardware dedicated to that execution and/or time slices of hardware temporally shared), forms a separate virtual network element(s).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a network node of a service management system, the method comprising:
   receiving, from a service installer, a first signed message including a request to authorize installation of a service image, a service image identifier, a service installer account identifier, and one or more hashes of the service image; and
   responsive to determining, based on the service installer account identifier and a distributed ledger, that the service installer is authorized to install a service image identified with the service image identifier in a cloud computing system, performing the following:
      recording the one or more hashes of the service image in a list of valid service images of the distributed ledger, and
      transmitting, to the service installer, a first message including a first service installation token and the service image identifier, wherein the first service installation token causes the service installer to install the service image in the cloud computing system.

2. The method of claim 1, wherein the performing further includes:
   recording the first service installation token in the distributed ledger.

3. The method of claim 1, further comprising:
   receiving, from a service image executer, a request to validate a service image, the request including a hash of the service installer account identifier and a second set of one or more hashes of the service image as retrieved by the service image executer from the cloud computing system;
   determining, based on the hash of the service installer account identifier, whether the second set of one or more hashes of the service image corresponds to the one or more hashes of the service image that are stored in the distributed ledger; and
   responsive to determining that the second set of one or more hashes of the service image corresponds to the one or more hashes of the service image that are stored in the distributed ledger, transmitting a confirmation, to the service image executer, that the service image can be executed.

4. The method of claim 1, wherein the determining, based on the service installer account identifier and a distributed ledger, that the service installer is authorized to install a service image includes:
   determining that the service installer account identifier is associated with a legitimate account in the distributed ledger; and
   determining that a public key corresponding to the service installer account identifier that is stored in the distributed ledger validates a signature of the first signed message.

5. The method of claim 1, further comprising prior to the receiving a request to authorize installation of a service image:
   receiving, from a service installer, a second signed message including a request for an account at the service management system, a service installation certificate, and a public key of the service installer; and
   responsive to determining, based at least in part on the service installation certificate, that the service installer is authorized to have an account at the service management system, performing the following:
      creating, in a distributed ledger, an account for the service installer identified with a service installer account identifier,
      recording, in the distributed ledger, the service installer account identifier and the public key of the service installer, and
      transmitting, to the service installer, the service installer account identifier.

6. The method of claim 1, further comprising:
   receiving, from a service installer, a third signed message including a request to authorize uninstallation of the service image, the service image identifier, and the service installer account identifier; and
   responsive to determining, based on the service installer account identifier and the distributed ledger, that the service installer is authorized to uninstall, from the cloud computing system, the service image identified with the service image identifier, performing the following:
      removing the one or more hashes of the service image from the list of valid service images of the distributed ledger, and
      transmitting, to the service installer, a third message including a service uninstallation token and the service image identifier, wherein the service uninstallation token causes the service installer to uninstall the service image in the cloud computing system.

7. A network node of a service management system, the network node comprising:
   one or more processors; and
   non-transitory computer readable storage media that stores instructions, which when executed by the one or more processors cause the network node to:
      receive, from a service installer, a first signed message including a request to authorize installation of a service image, a service image identifier, a service installer account identifier, and one or more hashes of the service image; and
      responsive to determining, based on the service installer account identifier and a distributed ledger, that the service installer is authorized to install a service image identified with the service image identifier in a cloud computing system, perform the following:
         record the one or more hashes of the service image in a list of valid service images of the distributed ledger, and
         transmit, to the service installer, a first message including a first service installation token and the service image identifier, wherein the first service installation token causes the service installer to install the service image in the cloud computing system.

8. The network node of claim 7, wherein to perform further includes to:
   record the first service installation token in the distributed ledger.

9. The network node of claim 7, wherein the network node is further to:
   receive, from a service image executer, a request to validate a service image, the request including a hash of the service installer account identifier and a second set of one or more hashes of the service image as retrieved by the service image executer from the cloud computing system;

determine, based on the hash of the service installer account identifier, whether the second set of one or more hashes of the service image corresponds to the one or more hashes of the service image that are stored in the distributed ledger; and responsive to determining that the second set of one or more hashes of the service image corresponds to the one or more hashes of the service image that are stored in the distributed ledger, transmit a confirmation, to the service image executer, that the service image can be executed.

10. The network node of claim 7, wherein to determine, based on the service installer account identifier and a distributed ledger, that the service installer is authorized to install a service image includes to:

determine that the service installer account identifier is associated with a legitimate account in the distributed ledger; and determine that a public key corresponding to the service installer account identifier that is stored in the distributed ledger validates a signature of the first signed message.

11. The network node of claim 7, wherein the network node is further to perform, prior to receive a request to authorize installation of a service image:

receive, from a service installer, a second signed message including a request for an account at the service management system, a service installation certificate, and a public key of the service installer; and responsive to determining, based at least in part on the service installation certificate, that the service installer is authorized to have an account at the service management system, perform the following:

create, in a distributed ledger, an account for the service installer identified with a service installer account identifier, record, in the distributed ledger, the service installer account identifier and the public key of the service installer, and transmit, to the service installer, the service installer account identifier.

12. The network node of claim 7, wherein the network node is further to:

receive, from a service installer, a third signed message including a request to authorize uninstallation of the service image, the service image identifier, and the service installer account identifier; and responsive to determining, based on the service installer account identifier and the distributed ledger, that the service installer is authorized to uninstall, from the cloud computing system, the service image identified with the service image identifier, perform the following:

remove the one or more hashes of the service image from the list of valid service images of the distributed ledger, and transmit, to the service installer, a third message including a service uninstallation token and the service image identifier, wherein the service uninstallation token causes the service installer to uninstall the service image in the cloud computing system.

13. A non-transitory machine-readable medium comprising computer program code which, when executed by a computer to be operated as a service management system, causes the computer to perform operations comprising:

receiving, from a service installer, a first signed message including a request to authorize installation of a service image, a service image identifier, a service installer account identifier, and one or more hashes of the service image; and responsive to determining, based on the service installer account identifier and a distributed ledger, that the service installer is authorized to install a service image identified with the service image identifier in a cloud computing system, performing the following:

recording the one or more hashes of the service image in a list of valid service images of the distributed ledger, and transmitting, to the service installer, a first message including a first service installation token and the service image identifier, wherein the first service installation token causes the service installer to install the service image in the cloud computing system.

14. The non-transitory machine-readable medium of claim 13, wherein the performing further includes: recording the first service installation token in the distributed ledger.

15. The non-transitory machine-readable medium of claim 13, the operations further comprising:

receiving, from a service image executer, a request to validate a service image, the request including a hash of the service installer account identifier and a second set of one or more hashes of the service image as retrieved by the service image executer from the cloud computing system;

determining, based on the hash of the service installer account identifier, whether the second set of one or more hashes of the service image corresponds to the one or more hashes of the service image that are stored in the distributed ledger; and responsive to determining that the second set of one or more hashes of the service image corresponds to the one or more hashes of the service image that are stored in the distributed ledger, transmitting a confirmation, to the service image executer, that the service image can be executed.

16. The non-transitory machine-readable medium of claim 13, wherein the determining, based on the service installer account identifier and a distributed ledger, that the service installer is authorized to install a service image includes:

determining that the service installer account identifier is associated with a legitimate account in the distributed ledger; and determining that a public key corresponding to the service installer account identifier that is stored in the distributed ledger validates a signature of the first signed message.

17. The non-transitory machine-readable medium of claim 13, the operations further comprising, prior to the receiving a request to authorize installation of a service image:

receiving, from a service installer, a second signed message including a request for an account at the service management system, a service installation certificate, and a public key of the service installer; and responsive to determining, based at least in part on the service installation certificate, that the service installer is authorized to have an account at the service management system, performing the following: creating, in a distributed ledger, an account for the service installer identified with a service installer account identifier, recording, in the distributed ledger, the service installer account identifier and the public key of the service installer, and transmitting, to the service installer, the service installer account identifier.

18. The non-transitory machine-readable medium of claim 13, the operations further comprising:
  receiving, from a service installer, a third signed message including a request to authorize uninstallation of the service image, the service image identifier, and the service installer account identifier; and
  responsive to determining, based on the service installer account identifier and the distributed ledger, that the service installer is authorized to uninstall, from the cloud computing system, the service image identified with the service image identifier, performing the following:
  removing the one or more hashes of the service image from the list of valid service images of the distributed ledger, and transmitting, to the service installer, a third message including a service uninstallation token and the service image identifier, wherein the service uninstallation token causes the service installer to uninstall the service image in the cloud computing system.

\* \* \* \* \*